Figure 1:
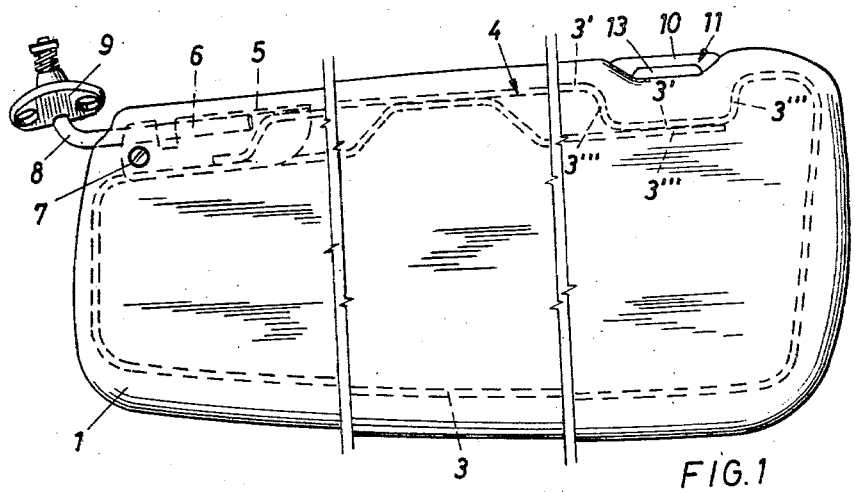

July 6, 1965 G. HERR ETAL 3,193,323
SUN VISOR FOR MOTOR VEHICLES
Filed Feb. 5, 1963

INVENTORS
GERHARD HERR
KURT CZIPTSCHIRSCH
BY Robert R. Youtie
ATTORNEY

United States Patent Office 3,193,323
Patented July 6, 1965

3,193,323
SUN VISOR FOR MOTOR VEHICLES
Gerhard Herr, Wuppertal-Vohwinkel, and Kurt Cziptschirsch, Wuppertal-Elberfeld, Germany, assignors to Gebr. Happich G.m.b.H., Wuppertal-Elberfeld, Germany, a company of Germany
Filed Feb. 5, 1963, Ser. No. 257,055
5 Claims. (Cl. 296—97)

The invention relates to a sun visor constructed as a padded body for motor vehicles or the like with the object of protection from accidents, having a pivot bearing arranged in a recess of the padded body, which is connected with an internal wire frame of the visor.

With the known sun visors of this kind the recesses are arranged, according to requirements, in the middle or at the ends of the upper edge of the visor. This requires a corresponding different cutting-out of the material serving for the production of the padded body.

Moreover sun visors are known wherein at one corner of the wire frame an outwardly projecting loop is provided, one leg of which lies in the axial direction and serves as a pivot axle. This construction increases the danger of accidents, particularly when the sun visor has been brought into a position swung out sideways.

The invention has, in contrast, the object of constructing a padded sun visor in such a manner that a simple and safe arrangement of a supporting and/or pivot bearing is possible, which may be fitted even subsequently to a finished, mounted sun visor.

This is attained according to the invention thereby that the axle of the pivot bearing is formed by the bridge portion of a U-shaped yoke, the legs of which are pushed through the padding material so as to leave a recess, and are hooked in holder means of the wire frame.

Owing to this construction, when cutting-out the material serving for making the padded body, the provision of separate recesses may be dispensed with. The recesses are formed instead automatically by pressing the U-shaped yoke into the soft and resilient padding material.

In this respect it is favourable if according to a development of the invention the legs of the U-shaped yoke are reduced in profile as compared with the bridge portion thereof so as to form stepped shoulders. These stepped shoulders abut the pad when inserting the U-shaped yoke and depress a recess in their immediate contact zone. Moreover these shoulders cover the marginal zones of the insertion holes.

A holding arrangement for the yoke which is advantageous as regards stability and simplicity is provided according to a development of the invention thereby, that the legs of the U-shaped yoke are provided with barbed hooks, which co-operate with opposite barbed hooks of holder plates arranged on the wire frame. With this arrangement primarily any additional attachment elements such as screws, rivets or the like may be dispensed with.

A structurally favourable construction is attained according to the invention thereby, that the holder plates are mounted on the connecting section between those two wire sections, which form the upper longitudinal leg of the visor frame, and are formed by a strip of sheet metal bent U-shape, which has the insertion opening for the legs of the U-shaped yoke on both sides of the bridge portion facing towards the upper longitudinal edge of the sun visor.

A space-saving and accident-preventing arrangement, which is effective even with the sun visor swung out sideways, is attained according to the invention thereby that the bridge portion of the yoke snaps into a bearing bracket, which is provided at its front with an insertion slot and lies within the recess of the visor body, being stepped back from the forward face thereof.

Figure 2:
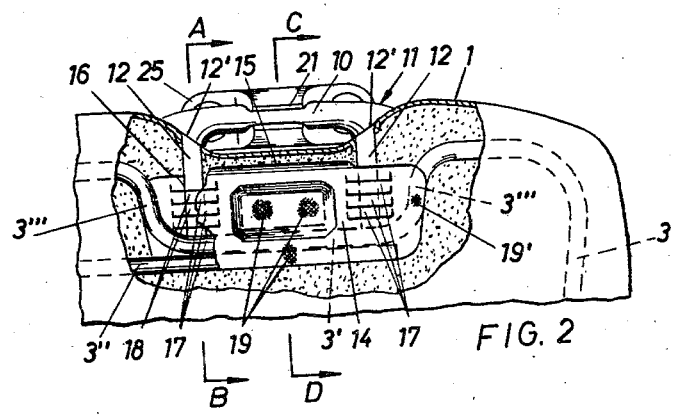
Figures 3, 4, 5:
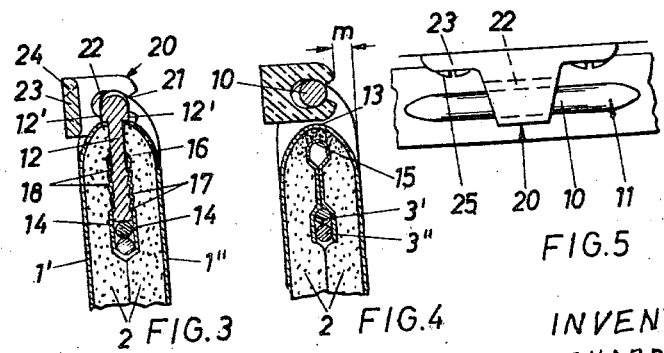

An embodiment of the invention is illustrated by way of example in the accompanying drawing, wherein:

FIG. 1 is a front elevation of a sun visor constructed as a padded body;
FIG. 2 is an enlarged view of the region of the right hand side pivot bearing, partly broken away;
FIG. 3 is a section on the line A—B of FIG. 2;
FIG. 4 is a section on the line C—D of FIG. 2; and
FIG. 5 is a plan view of the pivot bearing.

The sun visor has a cover 1 preferably made of a foil of synthetic material, which is arranged between the pocket walls 1' and 1" of cushion sheets 2 superimposed upon one another and the wire frame 3.

The wire frame 3 is spreadable and resilient. The upper longitudinal leg 4 of the visor is reinforced by duplication.

At its left hand side end the longitudinal leg 4 of the visor has a clip 5, which is constructed as a pivot bearing. This pivot bearing allows the adjustment of the sun visor plate to any high or low position desired by turning the same about the pivot axle 6. This adjustment is carried out with a braking effect. An adjustment of the braking effect is carried out by a clamping screw 7. The end 8 of the arm of the bearing axle 6 is turned up substantially at a right angle and enters into a bearing bracket 9, which is attached to the wall of the car body. When swinging the visor sideways, e.g. towards a side window of a motor car, the end 8 of the arm turns in the bracket 9.

On its right hand side end the longitudinal leg 4 of the visor frame has a second bearing, which is arranged coaxially with the pivot bearing. Its axle is formed by a bridge portion 10 of a U-shaped yoke 11. The latter has legs 12, which penetrate through the walls of the cover 1 and through the padding material 2, forming a recess 13. The legs 12 of the U-shaped yoke have stepped shoulders 12'; the legs 12 are accordingly reduced in profile as compared with the bridge portion 10, so that the shoulders 12' completely cover the marginal zones of the insertion holes. The shoulders 12' stand at an angle to the axes of the legs 12.

Below the U-shaped yoke 11 the wire section 3' of the longitudinal leg 4 of the visor frame is bent U-shaped and connected with the wire section 3" running underneath. On the connecting section thereby formed, the holder means for the legs 12 of the yoke 11 is mounted. This holder means conisists in a sheet metal strip bent U-shape, which forms the holder plates 14. The bridge portion 15 of the sheet metal strip as formed by the U-shape bending thereof, is substantially as long as the internal distance between the legs 12 of the yoke 11. Laterally of the bridge portion 15 there lie the insertion openings 16 for the legs 12 of the yoke. In the region of these inserted legs 12 of the yoke, barbs or teeth 17 are arranged, which are worked out of the material of the holder plates 17. They lie above one another in the manner of a Venetian blind, and are in engagement with corresponding upwardly directed barbs or teeth 18 of the legs 12 of the yoke.

The holder plates 14 are drawn towards one another in their middle zone, and spotwelded at the points 19 (see FIGS. 2 and 4) so that an inherently stable structural element is formed. The latter is welded at the edges of the holder plates 14 with the wire sections 3', 3" and 3"' at the spots 19'.

The bridge portion 10 of the yoke 11 forming the axle of the pivot bearing is snapped into a bearing bracket 20 consisting of a resilient synthetic material. For this purpose the latter is provided at its front with an insertion slot 21 which flares out outwardly for the purpose of facilitating the insertion of the bridge portion 10. The bearing hole 22 is slightly enlarged in the horizontal direction. The bottom 23 of the bracket 20 has passage holes 24 accommodating the attachment screws 25.

The bearing brackets 20 lies substantially completely within the recess 13 of the visor body, so that a far-reaching protection against injuries is afforded. It is stepped back the dimension $m$ from the front of the visor.

For the purpose of swinging the visor sideways, the bridge portion 10 is withdrawn from the bracket 20. In any position of the visor, the bridge portion 10' is protected by padding owing to its arrangement within the recess.

While we have herein described and illustrated in the accompanying drawing what may be considered a typical and particularly suitable embodiment of our said invention, we wish it to be understood, that we do not limit ourselves to the particular details and dimensions described and illustrated; for obvious modifications will occur to a person skilled in the art.

What we claim as our invention and desire to secure by Letters Patent, is:

1. A sun visor for motor vehicles comprising an elongate generally flat padded body, a pivotal mounting at one end of said body for connection to a vehicle and mounting the body for swinging movement about a generally vertical axis between front and side vehicle windows and swinging movement about a generally horizontal axis along one body side, a wire frame within and extending internally about said body, said body being formed with an edge recess along said one body side remote from said pivotal mounting, a generally U-shaped pivot bearing having its bight region in said recess extending longitudinally of said horizontal axis and its legs extending into said body, holder means in said body fixed to said frame and in firm holding relation with said pivot-bearing legs, and a bearing bracket for mounting on the vehicle and having an insertion slot for snap reception of the bight region of said pivot bearing.

2. A sun visor according to claim 1, said legs being of reduced dimensions relative to said bight region of define shoulders engaging said body.

3. A sun visor according to claim 1, said holder means comprising pairs of facing plates receiving therebetween said pivot-bearing legs, and interengaging holding formations on said facing plates and legs.

4. A sun visor according to claim 3, said pairs of facing plates being defined by a metal sheet folded upon itself about the adjacent portion of said frame.

5. A sun visor according to claim 4, said sheet and pivot-bearing legs being formed with barbs defining said holding formations.

References Cited by the Examiner

UNITED STATES PATENTS

| 2,578,612 | 12/51 | Stregack. |
| 2,627,099 | 2/53 | Becker _____ 85—5 X |

FOREIGN PATENTS

| 574,552 | 3/58 | Italy. |
| 1,109,788 | 9/55 | France. |
| 1,111,968 | 7/61 | Germany. |

A. HARRY LEVY, *Primary Examiner.*

PHILIP ARNOLD, *Examiner.*